(12) United States Patent
Norton

(10) Patent No.: US 6,897,660 B1
(45) Date of Patent: May 24, 2005

(54) POSITION SENSOR BASED ON MEASURING CAPACITANCE

(76) Inventor: Peter Norton, P.O. Box 62, Northville, MI (US) 48167

( * ) Notice: Subject to any disclaimer, the term of this patent is extended or adjusted under 35 U.S.C. 154(b) by 0 days.

(21) Appl. No.: 10/736,322

(22) Filed: Dec. 15, 2003

Related U.S. Application Data

(63) Continuation-in-part of application No. 10/215,772, filed on Aug. 9, 2002, now abandoned, which is a continuation-in-part of application No. 09/713,797, filed on Nov. 15, 2000, now abandoned.

(51) Int. Cl.⁷ .............................................. G01R 27/26
(52) U.S. Cl. ................... 324/660; 324/662; 340/870.37
(58) Field of Search ................................ 324/658–689; 340/870.37; 73/66, 460

(56) References Cited

U.S. PATENT DOCUMENTS 3,668,672 A * 6/1972 Parnell ....................... 324/660
5,418,468 A * 5/1995 Baker et al. ................. 324/674
5,598,153 A * 1/1997 Brasseur et al. ........ 340/870.37
6,118,283 A * 9/2000 Cripe .......................... 324/660

* cited by examiner

Primary Examiner—Vincent Q. Nguyen

(57) ABSTRACT

The armature of a position sensor has one or more electric current conductors adapted to be moved into and out of a gap between two capacitor electrodes. The capacitance between the capacitor electrodes is measured to determine the position of the armature. Electric current in the armature results from electric charges moving in the electric current conductors. The electric current conductors are adapted to restrict electric current therein to directions approximately perpendicular to the surfaces of the capacitor electrodes. Preventing current flow parallel to the surfaces of the capacitor electrodes in the electric current conductors makes the capacitance measurement insensitive to armature movement other than movement that moves the electric current conductors into or out of the gap. The position sensor is simpler and less expensive to make than known capacitance based position sensors.

21 Claims, 8 Drawing Sheets

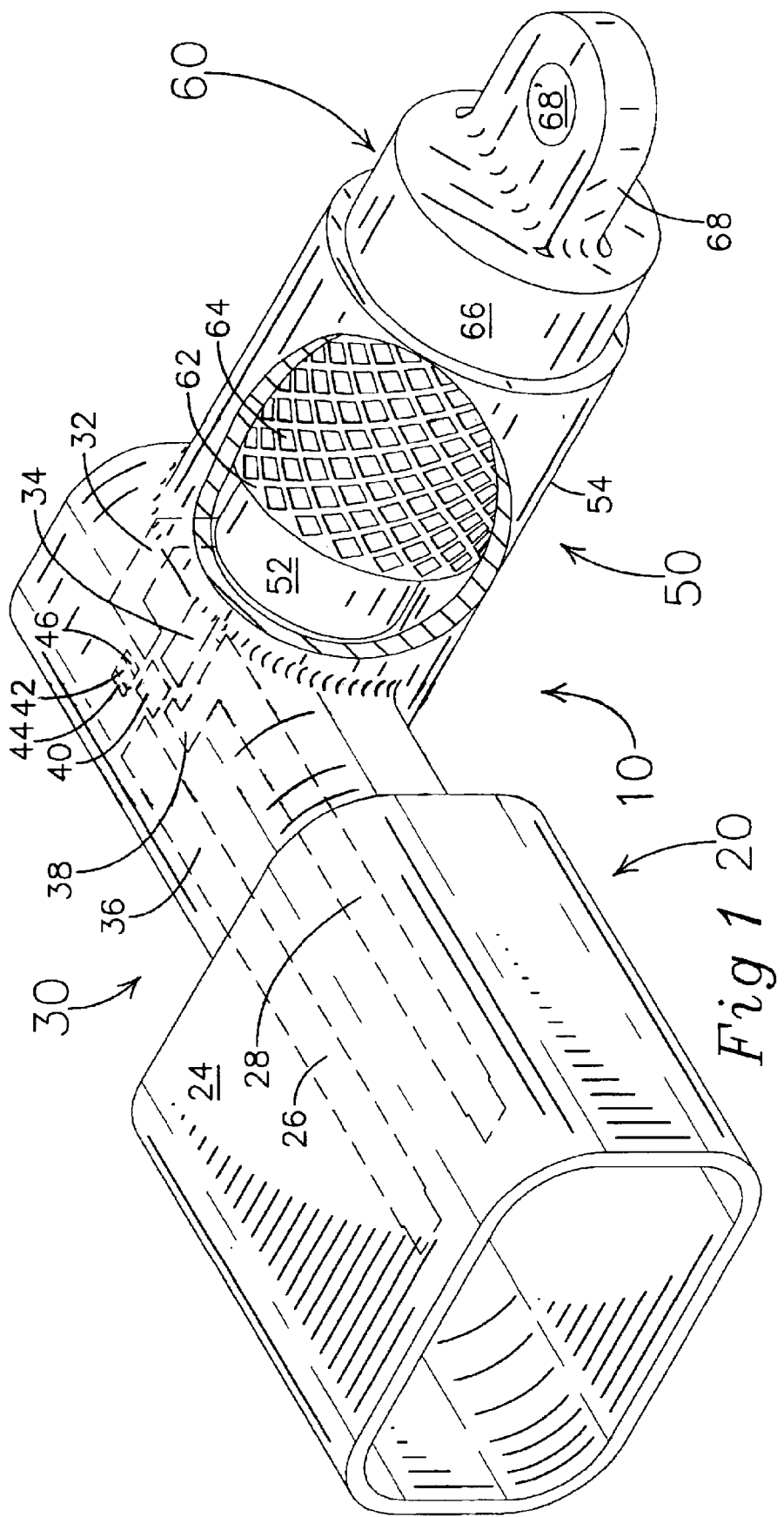

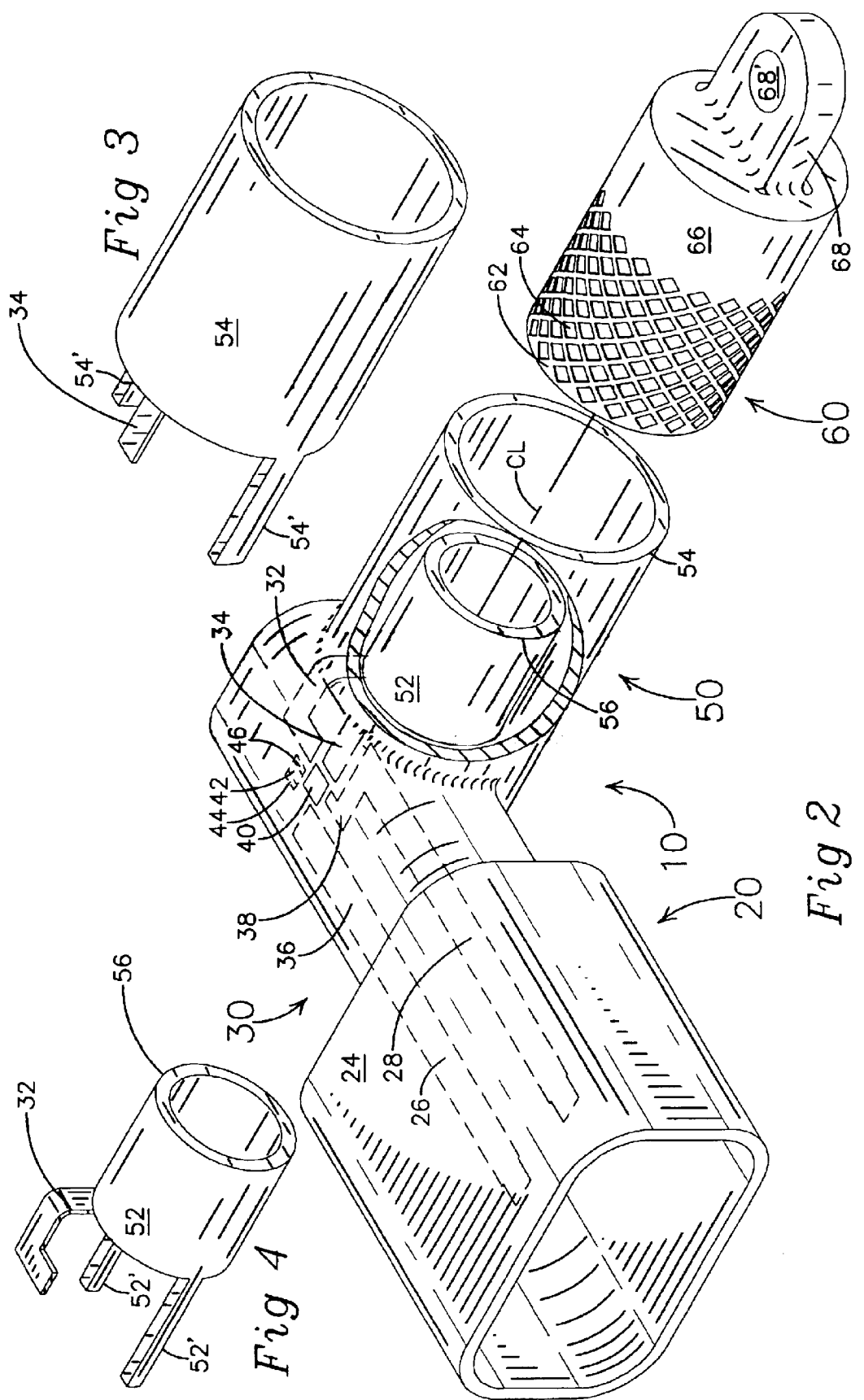

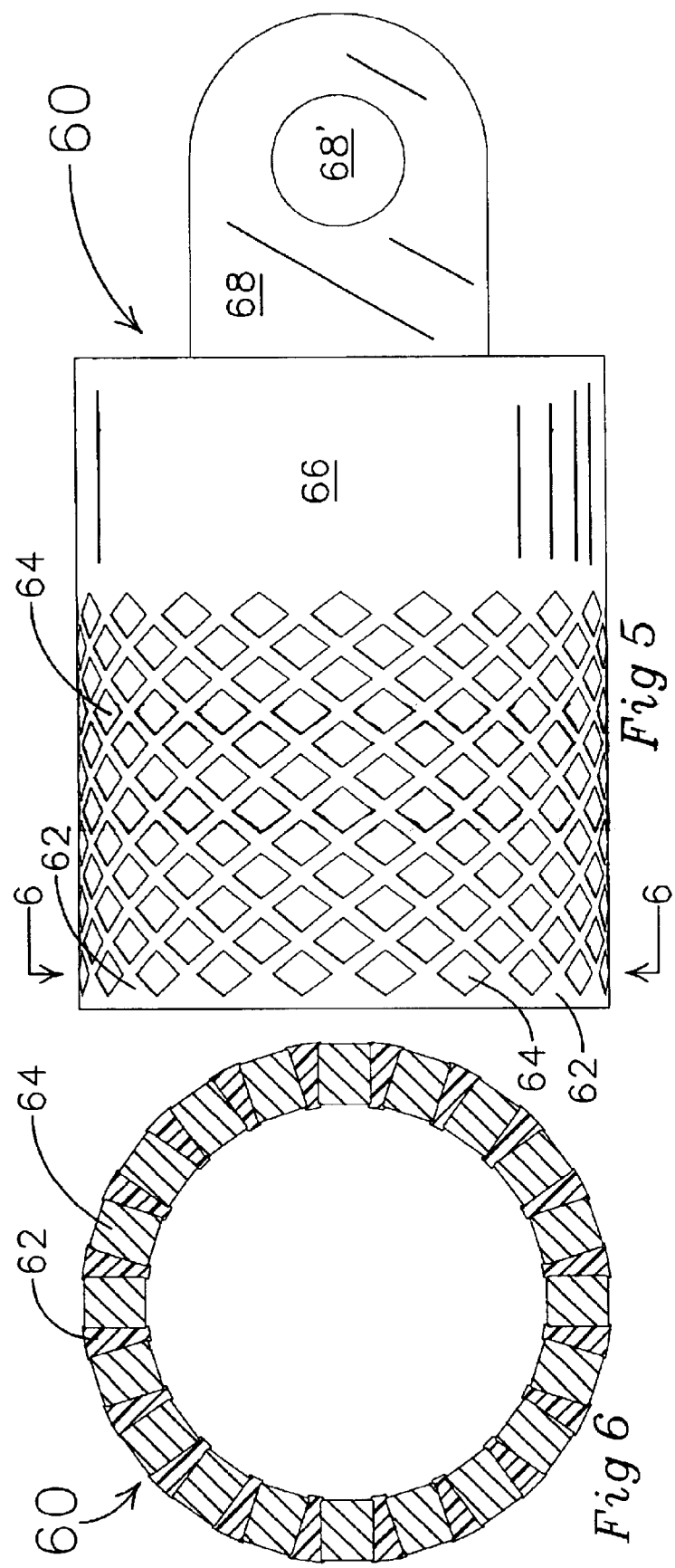

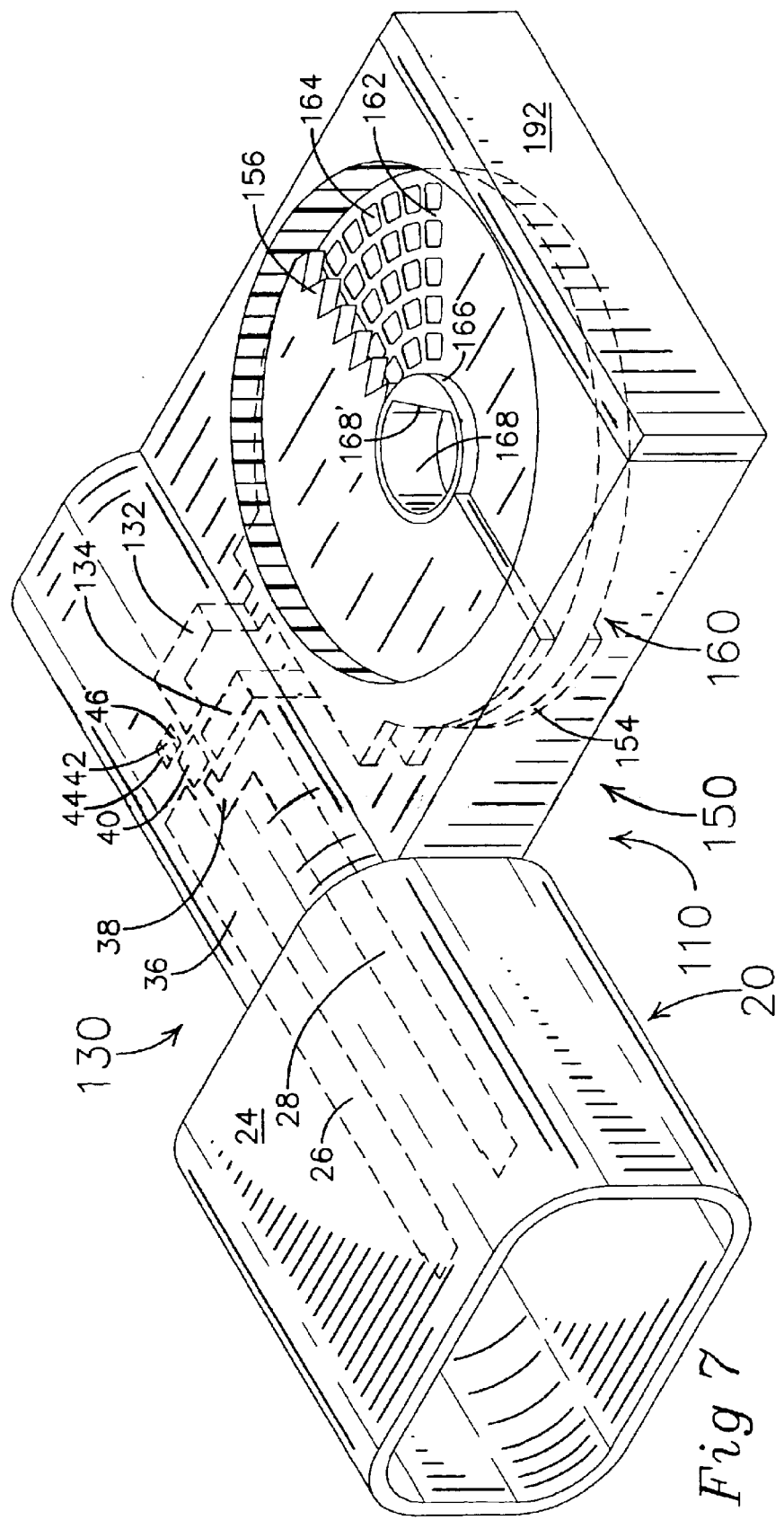

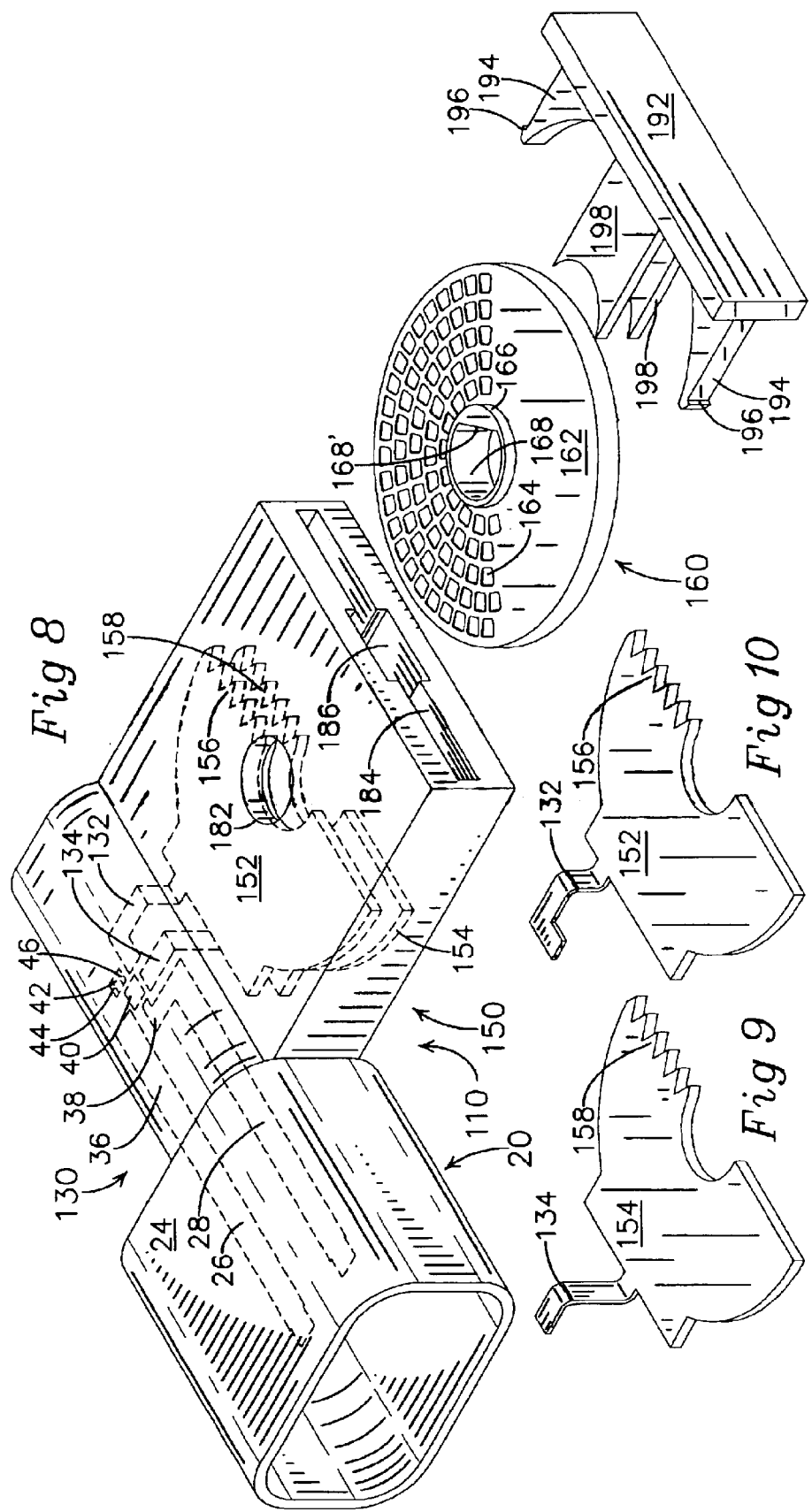

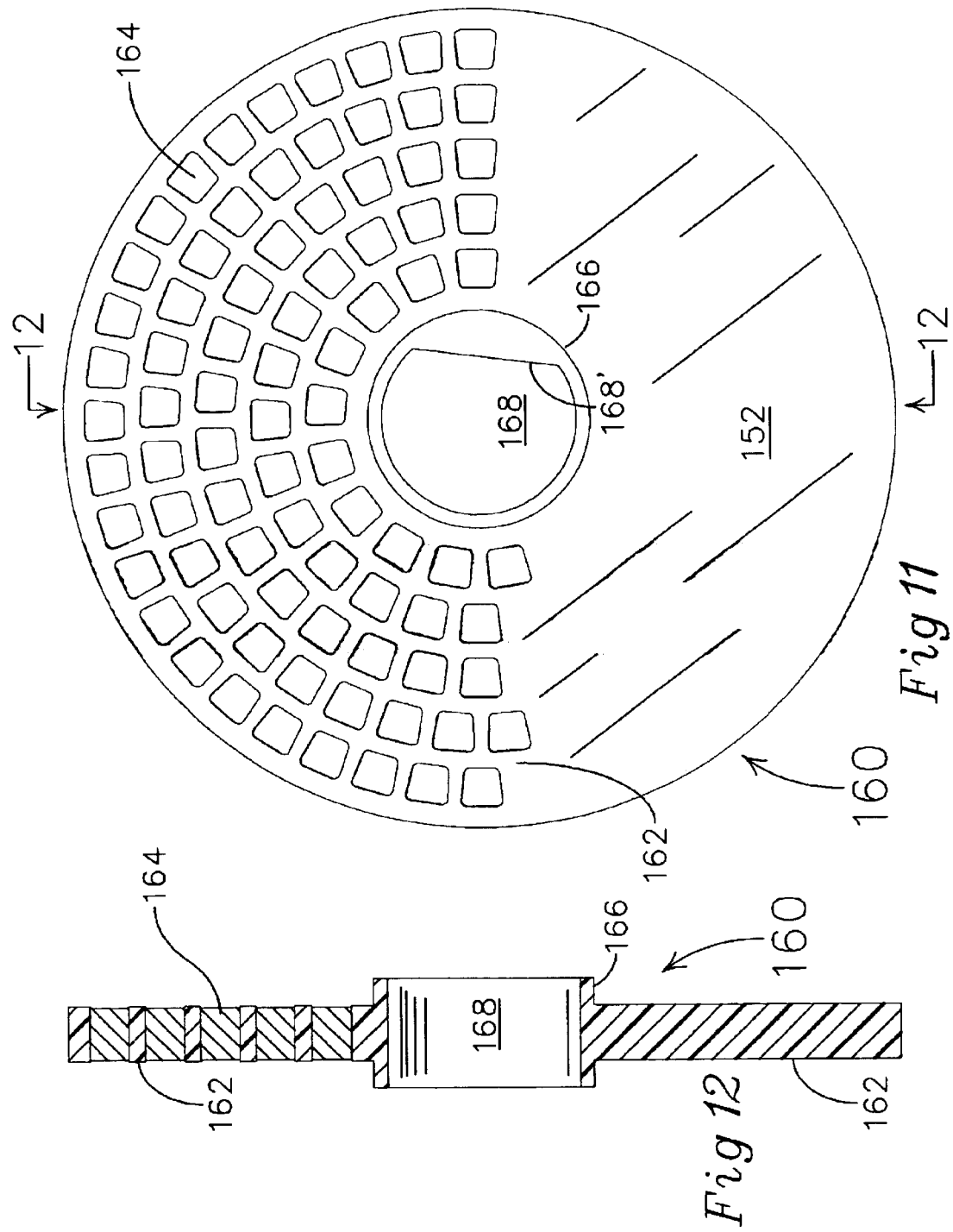

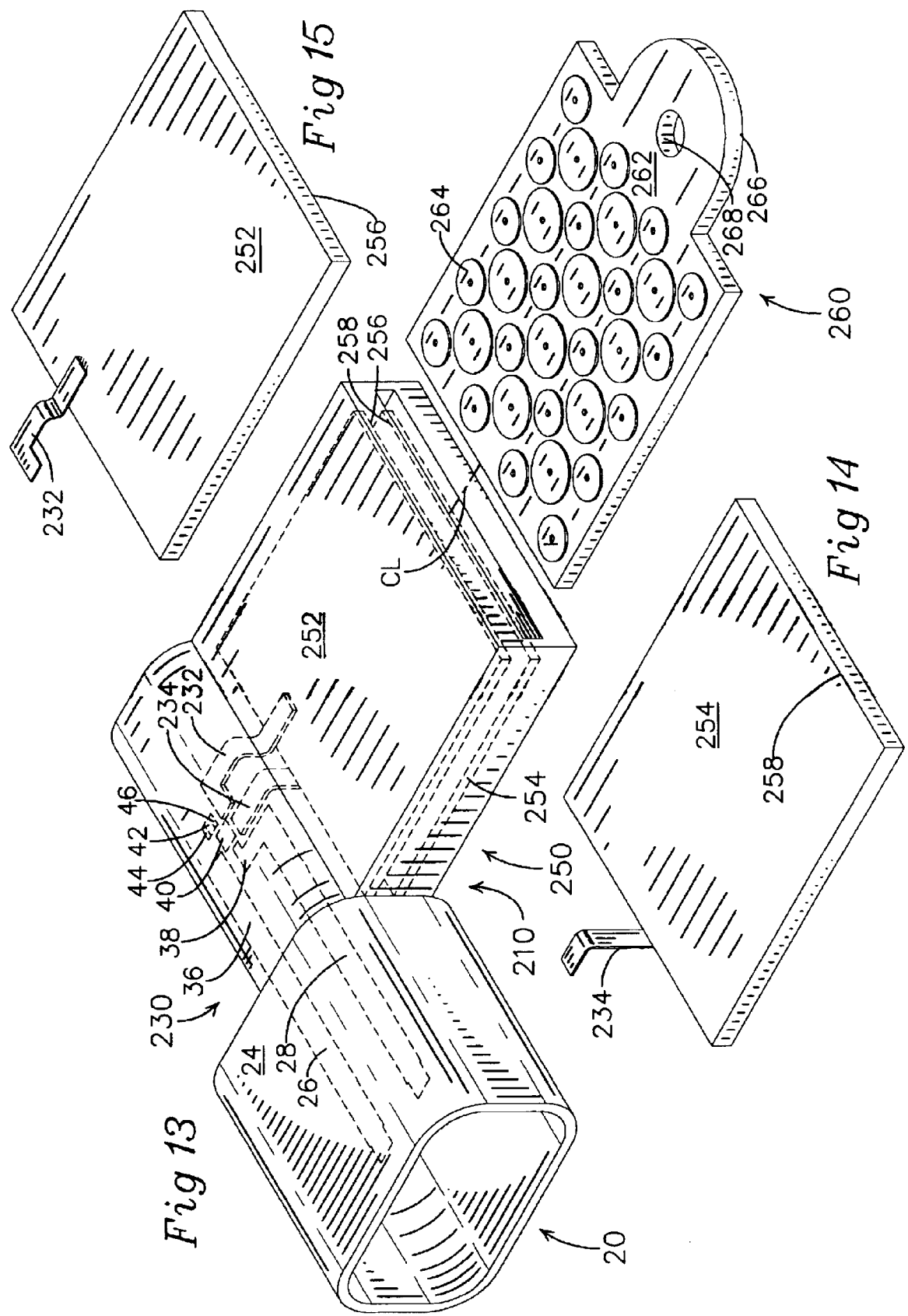

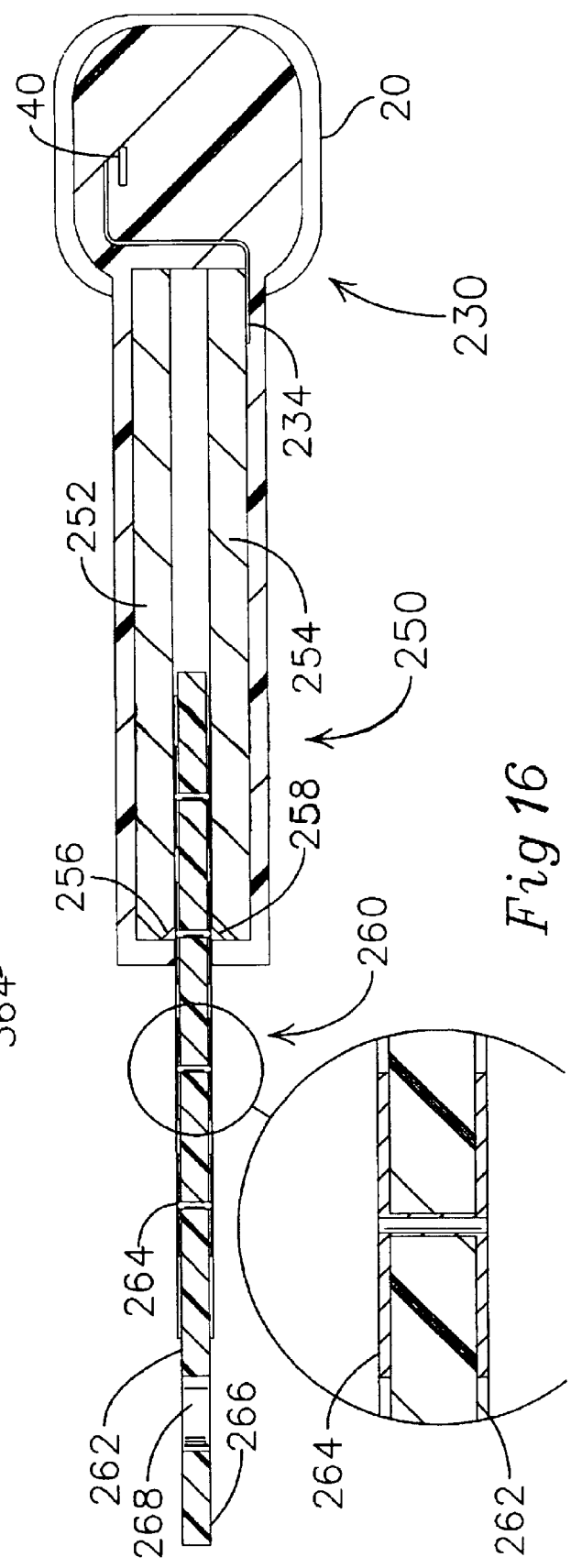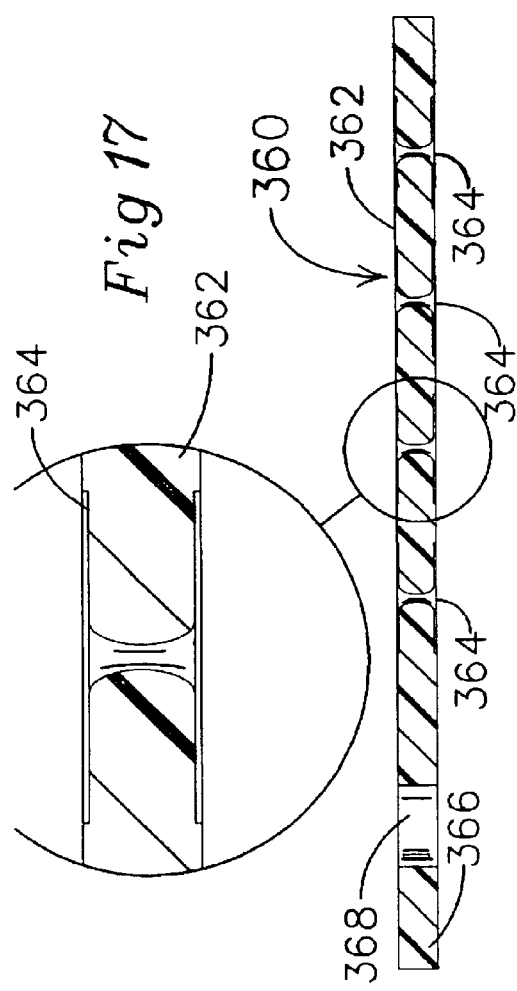

POSITION SENSOR BASED ON MEASURING CAPACITANCE

This application is a continuation-in-part of application Ser. No. 10/215,772 filed Aug. 9, 2002 now abandoned for *Position Sensor Based On Measuring Capacitance*, which is a continuation-in-part of application Ser. No. 09/713,797 filed Nov. 15, 2000 for *Position Sensor Based On Measuring Capacitance*, now abandoned.

FIELD OF THE INVENTION

This invention relates to linear or angular position sensors for applications in such as consumer appliances and automobiles.

BACKGROUND OF THE INVENTION

Variable capacitors are well known. Capacitors that vary their capacitance with rotation of an armature were used in radio tuners for many years. Combining a capacitor that varies its capacitance with rotation with a capacitance measuring device provides an angular position sensor.

CMOS integrated circuits for measuring capacitance are available from several sources. Micro Sensors of Costa Mesa, Calif. supplies the MS3110 integrated circuit which measures capacitance.

Of the known position sensing means, capacitance sensing is advantageous for being inherently insensitive to temperature, having an inherently linear output, not requiring permanent magnets, and allowing a wide variety of materials to be used in the sensor structure.

Prior to Applicant's invention, no low cost position sensors based on measuring capacitance were suitable for such as throttle position sensing in automobiles. Low cost capacitance position sensing has been limited to micromachined devices such as accelerometers and in diaphragm based pressure sensors in which the deflection of the diaphragm varies a capacitance. One reason sensors such as throttle position sensors and linear position sensors are not based on capacitance measurement is that known low cost capacitance based sensors are very sensitive to movements unrelated to the coordinate of the position being measured such as movements that place parts of the armature closer or farther from the capacitor electrodes.

Accordingly, there is an unmet need for an inexpensive linear or angular position sensor which is responsive by indicating positions along a direction or which indicates an angle of rotation but is unresponsive to other movements.

A reason prior art capacitance based position sensors are responsive to movements unrelated to the coordinates being measured is because such movements usually cause armature tilting, which moves a part of a movable electrical conductor of the armature nearer to one of the fixed capacitor electrodes while moving another part of the same movable electrical conductor nearer to a different fixed capacitor electrode, which greatly affects the capacitance.

Printed circuit boards are made in large numbers by chemically etching copper plated substrate to remove material from areas where conductors are not desired and drilling and plating holes to make connections between conductors on different layers. Turek et al. in U.S. Pat. No. 5,891,528 teaches that printed circuit boards with metallized holes can be formed by plasma spraying a conductive metal after preparing the substrate to keep the plasma sprayed metal from adhering to areas where metallization is not desired.

It is well known to plate metal on plastics by exposing plastic to vaporized metal. Plastics may also be metal plated by chemical vapor deposition as described by U.S. Pat. Nos. 5,191,099 to Gladfelter et al. and 6,399,772 to Shin et al.

A general object of this invention is to provide a low cost sensor offering superior performance and overcoming certain disadvantages of the prior art.

SUMMARY OF THE INVENTION

In accordance with the invention, an armature of a capacitance based position sensor restricts or prevents electric current flow in directions parallel to surfaces of capacitor electrodes while more freely permitting electric current flow in directions perpendicular to the surfaces of the capacitor electrodes. For controlling the electric current direction the armature may comprise a multiplicity of electric current conductors insulated from each other or, alternately, the armature may comprise a material having high impedance to electric current flow such as a high dielectric constant ceramic or an electrically conducting polymer. It is believed that providing a multiplicity of metallic electric current conductors in an insulating matrix is preferable to using a high impedance electric current conducting material because it is believed to be less expensive to make and to be more robust mechanically. Herein, "electric current" is defined to encompass conventional electric current in metallic and polymer electrical conductors and also to encompass displacement current in dielectric materials and "electric current conductor" is defined to encompass objects or materials that conduct conventional electric current and to also encompass objects or materials that have high dielectric constants that enable them to conduct displacement current.

Further, in accordance with certain embodiments of the invention, a capacitance based position sensor comprises two capacitor electrodes separated by a gap, an armature movable in an axial direction into and out of the gap, and a sensor responsive to the capacitance between the two capacitor electrodes. The armature is adapted to freely conduct electric current perpendicular to the capacitor electrodes and restrict or prevent electric current parallel to the capacitor electrodes, whereby the capacitance between the electrodes is proportional to the area of electricity conducting armature located between the capacitor electrodes.

Further, in accordance with the aforementioned certain embodiments of the invention, the aforementioned restricting or preventing electric current in directions parallel to the capacitor electrodes causes the response of the position sensor to armature movement in directions perpendicular to said axis (in cross-axis directions) to be small whereby the armature can fit loosely and move in cross axis directions without substantially affecting the measurement of the axial position of the armature.

Further, in accordance with a first embodiment of the invention, two fixed coaxial tubes separated by a gap are capacitor electrodes. A tubular armature moves axially into and out of the gap and causes the capacitance between the two capacitor electrodes to vary linearly with the armature position. A sensor measures the capacitance. The combination provides an inexpensive linear position sensor.

Further, in accordance with a second embodiment of the invention, two fixed parallel plates separated by a gap are capacitor electrodes. An armature rotates about an axis into and out of the gap and causes the capacitance between the two capacitor electrodes to vary linearly with the angular position of the armature. A sensor measures the capacitance. The combination provides an inexpensive angular position sensor.

Further, in accordance with a third embodiment of the invention, two parallel plates separated by a gap are capacitor electrodes. An armature moves along an axis into and out of the gap and causes the capacitance between the two electrodes to vary linearly with the axial position of the armature. A sensor measures the capacitance. The combination provides an inexpensive linear position sensor.

Further, in accordance with certain embodiments of the invention, an armature comprises a multiplicity of electric current conductors movable into and out of a gap between two capacitor electrodes whereby the capacitance varies linearly with the fraction of the conductors in the gap between the capacitor electrodes and is insensitive to armature movements that do not change the fraction. The capacitance is measured to provide an inexpensive position sensor.

Further, in accordance with certain embodiments of the invention, an armature comprises a multiplicity of electric current conductors movable between two capacitor electrodes, and wherein each electric current conductor when it is between the two capacitor electrodes has two surfaces each extending parallel to and in close proximity to a respective one of the fixed capacitor electrodes. The capacitance between the capacitor electrodes is measured to provide a position sensor that is less sensitive to cross-axis armature movement than prior art capacitance based position sensors.

Further, in accordance with certain embodiments of the invention, the armature moves between two capacitor electrodes and the aforementioned certain embodiments of the invention comprise material adapted to minimize the effect of temperature on the capacitance between the capacitor electrodes.

Further, in accordance with certain embodiments of the invention, the capacitance sensor and the capacitor electrodes are incorporated into a unitary plastic molding.

Further, in accordance with certain embodiments of the invention, the armature of the position sensor of the invention, the armature comprises a printed circuit board on which two arrays of copper pads are formed on opposite sides of the printed circuit board by a chemical etching process suitable for making printed circuits. The pads are arranged as pairs, each pad of a pair located opposite its mate on the other side of the printed circuit board. Holes are made at the centers of the pads and are plated in the conventional way to electrically connect the two pads of the pair. The pairs of pads each connected by a plated hole constitute a multiplicity of electric current conductors each adapted to allow electric current to flow by way of the plating on the holes between pads of a pair in directions perpendicular to the surfaces of the printed circuit board. Electric current does not flow substantial distances parallel to the surface of the printed circuit board because adjacent pads do not contact each other. Therefore, the only current flow from a pad is to its mating pad, thereby providing substantially unidirectional electric currents in the armature of the invention.

Further, in accordance with a second embodiment of the armature of the position sensor of the invention, the armature comprises a matrix molded of plastic retaining an array of electric current conductors. The plastic matrix preferably stands proud of the conductors to provide low friction between the armature and the capacitor electrodes. It should be noted that the position measurement is not affected by a single electrical contact between an electric current conductor and a capacitor electrode. A conductor contacting both capacitor electrodes would cause failure.

Further, in accordance with the aforementioned second embodiment of the armature of the invention, the armature comprises a plastic molding shaped to fit between two capacitor electrodes, one side being in close proximity to one capacitor electrode and another side being in close proximity to the other capacitor electrode. The plastic molding also comprises an array of small holes extending between the two aforementioned sides. A metal such as aluminum is vapor deposited on both of the aforementioned sides and the surfaces of the holes, thereby forming the electrical equivalent of the plated feedthroughs formed by drilling and plating holes in printed circuit boards. To form pads that are electrically insulated from each other each hole is surrounded by a slight depression. The lands surrounding the depressions may be treated to prevent metal from being vapor deposited on the lands. Alternately, vapor deposited metal is selectively removed from the lands surrounding the depressions by a lapping operation or other suitable removal process. Either process provides a multiplicity of pairs of conducting pads, with the pads of each pair connected electrically by the plating on the hole therebetween and each pair of pads insulated from its neighboring pads by the metal free lands.

Further, in accordance with a third embodiment of the armature of the position sensor of the invention, the armature comprises high dielectric constant material or high resistance material that extends parallel to and in close proximity to the two fixed capacitor electrodes. In armatures of this design the electric current flow in the armature is primarily in directions perpendicular to the surfaces of the capacitor plates because the high impedances of the armature material provides greater opposition to current flow over the longer distances of flow parallel to the capacitor electrodes.

Further, in accordance with the invention, the capacitance sensor is manufactured in an assembly unitary with an electrical connector and the capacitor electrodes. This provides a particularly simple manufacture in which all electrical components are included in a single plastic molding.

A complete understanding of this invention may be obtained from the description that follows taken with the accompanying drawings.

DESCRIPTION OF THE DRAWINGS

FIG. 1 shows a perspective view of a first embodiment of a linear position sensor of the invention cut away to show the armature between the capacitor electrodes and with certain hidden elements shown by hidden lines.

FIG. 2 shows the embodiment of the invention illustrated in FIG. 1 but with the armature removed to more clearly show certain features and with certain hidden elements shown by hidden lines.

FIG. 3 shows in a perspective view the outer, tube-shaped capacitor electrode of the linear position sensor illustrated in FIG. 1.

FIG. 4 shows in a perspective view the inner, tube-shaped capacitor electrode of the linear position sensor illustrated in FIG. 1.

FIG. 5 shows a top view of the armature of the linear position sensor of the invention sensor illustrated in FIG. 1.

FIG. 6 shows a section of the armature of the linear position sensor of the invention illustrated in FIG. 1 taken at section 6—6 of FIG. 5.

FIG. 7 shows in perspective view an angular position sensor of the invention cut away to show the armature and a capacitor electrode and with certain hidden elements shown by hidden lines.

FIG. 8 shows a partially exploded view of the embodiment of the invention illustrated in FIG. 7 showing the armature and cover isolated to more clearly show certain features.

FIG. 9 shows in a perspective view one of the capacitor electrodes of the angular position sensor of the invention illustrated in FIG. 7.

FIG. 10 shows in a perspective view the other of the capacitor electrodes of the angular position sensor illustrated in FIG. 7.

FIG. 11 shows a top view of the armature of the position sensor of the invention illustrated in FIG. 7.

FIG. 12 shows partially in section the armature of the position sensor of the invention illustrated in FIG. 7 taken at section 12—12 of FIG. 11.

FIG. 13 shows in perspective view a second embodiment of a linear position sensor of the invention with the armature removed to more clearly show certain features and with certain hidden elements shown by hidden lines.

FIG. 14 shows in a perspective view one of the capacitor electrodes of the linear position sensor of the invention illustrated in FIG. 13.

FIG. 15 shows in a perspective view the other of the capacitor electrodes of the linear position sensor illustrated in FIG. 13.

FIG. 16 shows in section certain parts of the linear position sensor of the invention illustrated in FIG. 13.

FIG. 17 shows in section an alternate armature for the linear position sensor of the invention illustrated in FIG. 13.

BEST MODE FOR CARRYING OUT THE INVENTION

Referring now to FIGS. 1, 7, and 13, three illustrative embodiments of the invention are shown. Each embodiment comprises: a plastic molding unitary with an electrical connector 20; a capacitance sensor 40 connected to measure the capacitance between two capacitor electrodes (52–54, 152–154, and 252–254); and an electric current conducting armature (60, 160, 260) movable into and out of a gap between the electrodes whereby the capacitance between the electrodes is a measure of the fraction of the gap occupied by the electric current conducting portion of the armature. The armature is adapted to conduct electricity only in directions perpendicular to the electrodes by providing a multiplicity of electric current conductors insulated from each other. The electric current conductors (64, 164, 264) extend from a first surface in close proximity to one of the capacitor electrodes to a second surface in close proximity to the other of the capacitor electrodes.

Continuing with reference to FIGS. 1, 7 and 13, linear position sensors 10 and 210 and angular position sensor 110 provide a position signal through connector pins 26 and 28 indicating the linear or angular position of the armature. Linear position sensor 10 comprises armature 60, connector 20 and capacitance sensor assembly 30. The output of linear position sensor 10 is an electric signal indicating the axial position of armature 60 with respect to capacitor electrodes 52 and 54. Angular position sensor 110 comprises connector 20, capacitance sensor assembly 130, capacitor electrode assembly 150, and armature 160. Armature 160 is adapted to be rotated by a "D" shaft the angular position of which is to be measured. Linear position sensor 210 comprises armature 260, connector 20 and capacitance sensor assembly 30. The output of linear position sensor 210 is an electric signal indicating the axial position of armature 260 with respect to capacitor electrodes 252 and 254. Capacitance sensor 40 of capacitive position sensor 10, 110 or 210 indicates the fraction of the gap between the capacitor electrodes that is filled by the electric current conductors of the armature. That fraction is proportional to the position which is to be measured.

It will be appreciated as the description proceeds that the invention may be implemented in different embodiments.

Proceeding now to describe the first embodiment of the position sensor of the invention with reference to FIGS. 1 through 6: Linear position sensor 10 comprise electrical connector 20, capacitance sensor assembly 30, capacitor electrode assembly 50, and armature 60 that is axially movable relative to capacitor electrode assembly 50.

Electrical connector 20 comprises connector pins 26 and 28 in a molded shroud 24. Capacitance sensor assembly 30 is unitary with electrical connector 20 and capacitor electrode assembly 50. Capacitance sensor assembly 30 includes extensions 36 and 38 of connector pins 26 and 28 respectively, reference capacitor 42, extensions 32 and 34 of capacitor electrodes 52 and 54 respectively, and capacitance sensor 40. Capacitor electrode assembly 50 comprises capacitor electrodes 52 and 54. Armature 60 comprises a tube-shaped end 62 having openings for containing electric current conductors 64, an extension 66 and a coupling 68 with opening 68' to which a movable part is connected for its movement to be sensed. The elements illustrated by dashed or hidden lines are hidden from view by the plastic molding.

Connector pins 26 and 28 are preferably made by the processes conventionally used for making connector pins from a material such as gliding metal or other pin material suitable for connection by wire bonding to capacitance sensor 40.

Reference capacitor 42, if required, is preferably a capacitor chosen for having a stable capacitance over the range of operating temperatures. Mica and certain ceramic capacitors are specified by their manufacturers to be stable over wide temperature ranges. Reference capacitor 42 has wire bonding pads 44 and 46 for connecting to capacitance sensor 40 by such as ultrasonic wire bonding.

Capacitor electrodes 52 and 54 comprise tubes made of a metal such as aluminum or copper alloy. If aluminum is selected it is preferably anodized to prevent galling and to minimize friction. Capacitor electrodes 52 and 54 are located on a common axis CL with electrode 52 inside electrode 54. Capacitor electrode 52 may have a bevel at edge 56 over which armature 60 passes.

If present, the bevel at edge 56 is designed to smooth the capacitance deviations from linearity which otherwise happen because of the granularity of the conductivity of armature 60 from the multiplicity of conductors. Making the length of the bevel at edge 56 equal to approximately one half of the axial dimension of one of the conductors 64 provides smooth output with linear position changes. Capacitor electrodes 52 and 54 have extensions 32 and 34 respectively extending to the vicinity of capacitance sensor 40 to which they are connected. Extensions 32 and 34 may be unitary with capacitor electrodes 52 and 54 or they may be extensions welded to the capacitor electrodes. Capacitor electrodes 52 and 54 also have attachments 52' and 54' respectively which extend into the molding for attachment and structural integrity. The inside diameter of capacitor electrode 54 extends beyond capacitor electrode 52 to provide a bearing surface for bearing armature 60 in its movement.

Armature 60 comprises tube-shaped end 62, an extension 66, and coupling 68. Tube-shaped end 62 is made of a plastic with a matrix of openings for retaining a multiplicity of electric current conductors 64. The preferred material for conductors 64 is the same material as capacitor electrodes 52 and 54 to minimize output change with temperature. The plastic may be any compound suitable for such as insert molded electric connectors. Molded nylon or polyphenylene sulfide with about 30% to 40% filler are believed to be good selections that provide good lubricity and temperature stability. The electric current conductors 64 may be made from short lengths of drawn metal wire. Alternately, tube shaped end 62 may be molded in a shape suitable for use with electric current conductors made by depositing vaporized aluminum or by other known processes such as the processes described hereinafter with reference to FIGS. 13 through 17 for making electrically conducting pads and feedthroughs. For the case wherein conductors 64 are short lengths of metal wire or ceramic, they are made with rounded edges by which they are retained. The tube-shaped end 62 is preferably molded to have lips at the openings of the spaces that retain electric current conductors 64. The lips are molded to fit the rounded edges of electric current conductors 64 for retaining the electric current conductors 64.

If the electric current conductors 64 are made of a high dielectric constant ceramic or low conductivity material then two possible designs must be considered. The first design is exactly like the design with metal electric current conductors 64 except that the electric current conductors 64 are made of a different material. This design offers the advantages of totally preventing electric current parallel to the capacitor electrodes and possibly lower friction because of the lubricity of the thermoplastic polymer matrix. A preferred material for the first design is a ceramic selected to have the largest dielectric constant available at an acceptable cost. In the alternate design the tube-shaped end 62 and the electric current conductors 64 are a unitary ceramic or plastic molding. The material for the second design is selected to have sufficient mechanical strength and also to have an impedance no less than necessary to make the impedance across the gaps between the electric current conductors 64 and capacitor electrodes 52 and 54 much greater than the impedance across the electric current conductors 64. Having no less than the necessary minimum impedance minimizes the electric current in directions parallel to the capacitor electrodes.

Electrical connector 20, capacitance sensor assembly 30, and capacitor electrode assembly 50 are preferably made by the following insert molding process: Connector pins 26 and 28 which are unitary with extensions 36 and 38, capacitor electrode extensions 32 and 34, reference capacitance 42, and capacitance sensor 40 are placed in a fixture that may be used later as a part of the mold and are electrically connected together by such as ultrasonic wire bonding. A small amount of potting material is placed at and near the wire bonds to protect the capacitance sensor and bonded wires. Thermoplastic polymer is then injection molded around the aforementioned components to form a unitary assembly.

The materials and methods referred to hereinabove are only suggestions and others may be substituted by those skilled in the relevant arts.

The operation of the linear position sensing system 10 of the invention will now be described with reference to FIGS. 1 through 6. In operation of the system, the capacitance between capacitor electrodes 52 and 54 is small when the electric current conductors 64 of armature 60 are not between capacitor electrodes 52 and 54. When electric current conductors 64 move into the gap between capacitor electrodes 52 and 54, the gap between the capacitor electrodes 52 and 54 is effectively reduced where the electric current conductors 64 are in close proximity to the capacitor electrodes 52 and 54. For example, the gap between capacitor electrodes 52 and 54 may be one or two millimeters which might result in a capacitance of approximately one picofarad between the two electrodes in the absence of armature 60. The two gaps between electric current conductors 64 and capacitor electrodes 52 and 54 may total 0.05 millimeters to 0.1 millimeters so that the capacitance of the exemplary sensor may increase by a factor of five to twenty between an empty gap and when the electric current conductors 64 of the armature are in the gap between the capacitor electrodes.

The capacitance varies linearly with the position of armature 60 and is sensed by capacitance sensor 40, which responds by providing a signal that indicates the axial position of armature 60 relative to the capacitor electrodes.

The armature also moves in directions perpendicular to the common axis of capacitor electrodes 52 and 54. This cross axis movement will happen because the surfaces that rub together are not perfectly smooth and for other reasons. Cross-axis movement will cause each of the electric current conductors 64 to move within the gap between capacitor electrodes 52 and 54. To the extent that the fringing field at the periphery of the electric current conductors 64 can be neglected, the capacitance will not be affected by the movement of electric current conductors 64 within the gap. By making the area of the fringing field small relative to the surface areas where electric current conductors 64 face the capacitor electrodes, the effects of cross-axis movement are made small. Therefore, the multiplicity of metallic electric current conductors 64 of armature 60 cause the capacitance between capacitor electrodes 52 and 54 to be highly independent of the cross-axis position of armature 60 while being linearly dependent on the axial position of armature 60. Accordingly, the invention meets the unmet need for a capacitance based position sensor that is insensitive to movements that are distinct from movements in the axial direction.

The following example is presented to illustrate and explain the operation of a high impedance electricity conducting material to limit the electric current to the direction perpendicular to the capacitor electrodes in the case when tube-shaped end 62 conducts electric current and there are no discrete the electric current conductors 64. Assume that the diameter of the tube-shaped end is one centimeter, it is one centimeter long, its thickness is one millimeter, and it is made of material having an impedance of one megohm-centimeter in operation. Assume the frequency is such that the capacitive reactance between capacitor electrodes 52 and 54 is one megohm when the gap is empty and that the capacitive reactance is 0.1 megohm when tube-shaped end 62 fills the gap between capacitor electrodes 52 and 54. The surface area of tube-shaped end 62 is approximately 3 square centimeters. The material impedance times the thickness divided by the area is the reactance which calculates to be 0.03 megohms between its inside diameter and its outside diameter. This is small relative to the smallest reactance including the gap which is approximately 0.1 megohm. Therefore, the measured capacitance is approximately the same as if the reactance of tube-shaped end 62 were negligible (i.e. if end 62 comprised a number of metallic conductors 64).

Continuing, now, the example by considering current flow parallel to the surface of capacitor electrodes 52 and 54. The circumference of the tube-shaped end is approximately three centimeters and the length is approximately one centimeter. These distances result in reactances of approximately three or more megohms. These reactances are for tangential paths from end to end or from the side at one diameter to a side at the opposite diameter. These reactances are much greater than the reactances seen by current flowing in the radial direction. It follows that the predominant current flow will be in the radial direction. The high impedance electric current conducting material operates to similar effect as if it were divided into pieces like conductors 64 and the pieces were insulated from each other as described hereinabove.

Proceeding now to describe the position sensor of the invention with reference to FIGS. 7 through 12: Angular position sensor 110 comprises electrical connector 20, capacitance sensor assembly 130, capacitor electrode assembly 150, and armature 160 rotatable between capacitor electrodes 152 and 154.

Electrical connector 20 comprises connector pins 26 and 28 in a molded shroud 24. Capacitance sensor assembly 130 is unitary with electrical connector 20 and capacitor electrode assembly 150. Capacitance sensor assembly 130 includes extensions 36 and 38 of connector pins 26 and 28 respectively, reference capacitance 42, extensions 132 and 134 of capacitor electrodes 152 and 154 respectively, and capacitance sensor 40. Capacitor electrode assembly 150 comprises capacitor electrodes 152 and 154 and cover 192. Armature 160 comprises a disk 162 retaining electric current conductors 164, an extension and bearing 166 and a central opening 168 with flattened side 168' to which a rotatable part is connected for its angular position to be sensed. The elements illustrated by dashed or hidden lines are hidden from view by the plastic molding.

Shroud 24, connector pins 26 and 28, capacitance sensor 40, and reference capacitor 42 may be the same as described hereinabove with reference to FIGS. 1 through 6.

Capacitor electrode assembly 150 comprises a plastic molding unitary with electrical connector 20 and capacitance sensor assembly 130. Capacitor electrode assembly 150 also comprises capacitor electrodes 152 and 154, openings 182 (only one is illustrated), channels 184 and 186 and cover 192. Openings 182 accommodate a shaft for engaging armature 160. Channels 184 provide entrance for disk 162 and surfaces for engaging extensions 194 and pawls 196 of cover 192. Ledges (not illustrated) in channels 184 engage pawls 196 for latching cover 192 into place. Instead of or in addition to retention by pawls 196, cover 192 may be attached by known means for attaching plastic covers which includes by adhesive, acoustic welding, friction welding, or other means known to be suitable by those skilled in the relevant arts. Channels 186 provide entrance for extensions and bearings 166 of disk 162 and for extensions 198 of cover 192. Extensions 198 of cover 192 engage extensions and bearings 166 of disk 162 for keeping armature 160 in its predetermined location. Cover 192 covers the end of capacitor electrode assembly 150 and may include a seal (not illustrated) to keep dirt and liquid away from disk 162.

Capacitor electrodes 152 and 154 comprise flat electrodes made of a metal such as aluminum or a copper alloy. If aluminum is selected it is preferably anodized to prevent galling and reduce friction. Capacitor electrodes 152 and 154 are positioned parallel to each other are spaced to form a gap. Capacitor electrodes 152 and 154 may have a slight bevel at the edges 156 and 158 over which the electric current conductors 164 of armature 160 pass. The bevel smooths the fluctuations in the capacitance signal which would otherwise happen when armature 160 moves because of the granularity of the conductivity of armature 160. Alternately, capacitor electrodes 152 and 154 may have saw shaped edges 156 and 158 as illustrated in FIGS. 9 and 10. The saw shape at edges 156 and 158 smooths the fluctuations in the capacitance signal caused by the granularity of the conductivity of armature 160.

Capacitor electrodes 152 and 154 have extensions 132 and 134 extending to the vicinity of capacitance sensor 40 to which they are connected. Extensions 132 and 134 may be unitary with capacitor electrodes 152 and 154 or they may be extensions welded to the capacitor electrodes. If extensions 132 and 134 are welded to the capacitor electrodes they may be any material known by those skilled in the relevant arts to be suitable for connection by wire bonding to capacitance sensor 40 and welding to the material selected for capacitor electrodes 152 and 154.

Armature 160 comprises a disk 162 having a portion made conductive by electric current conductors 164, two extension and bearing surfaces 166, and a central opening 168 with a flat surface 168' for engagement to and rotation with a "D" shaped shaft for sensing the angular position of the "D" shaped shaft. Disk 162 is molded of electrically insulating plastic with an array of openings for containing a multiplicity of electric current conductors 164. The plastic of which disk 162 is molded may be any plastic suitable for retaining electric current conductors 164. A material having the same thermal expansion coefficient as the material of which capacitor electrode assembly 150 is molded is preferred. Disk 162 is preferably molded to have lips at the openings of the cavities shaped to fit the rounded edges at the ends of electric current conductors 164 to retain electric current conductors 164 in armature 160.

A preferred material for electric current conductors 64 is drawn metal wire cut into short lengths, preferably by an orbital cutter which rounds the edges of the cut surfaces. The openings in disk 162 have molded lips to engage the rounded edges and retain the electric current conductors 64. An alternate preferred material for electric current conductors 164 is an electrically conducting polymer having a thermal expansion coefficient approximately the thermal expansion coefficient of the plastic of which capacitor electrode assembly 150 is molded to minimize sensitivity to temperature. A second alternate preferred material for electric current conductors 164 is a high dielectric constant ceramic. Other alternates for electric current conductors 64 are plated areas made by the processes described hereinafter with reference to FIGS. 13 through 17 for making electrically conducting pads and feedthroughs.

Two designs must be considered if the electric current conductors 164 are made of a high dielectric constant ceramic or a conductive polymer. The first design provides a multiplicity of ceramic or polymer electric current conductors 164 in the matrix of disk 162 which offers the advantage of preventing electric current flow in directions parallel to the capacitor electrodes and also offers the lubricity of the matrix standing proud of the ceramic electric displacement current conductors 164 and lubricating the movement of armature 162. The preferred material in this first design for the electric current conductors of disk 162 is the material having the least resistance or reactance available at an acceptable cost.

In the second design for disk 162 for the case wherein electric current conductors 164 are made of high dielectric constant ceramic or a conductive polymer, the electric current conductors 164 are replaced by a single piece of ceramic or polymer. The material for the second design for disk 162 is selected to have sufficient mechanical strength and also have an impedance no less than is necessary to make the impedance across the gaps between the electric current conductors 164 and capacitor electrodes 152 and 154 much greater than the impedance across electric current conductors 164. Having no less than the necessary impedance minimizes the electric current in directions parallel to the capacitor electrodes as described hereinabove.

Electrical connector 20 with capacitance sensor assembly 130 and capacitor electrode assembly 150 are preferably made by the following insert molding process: Connector pins 26 and 28 which are unitary with extensions 36 and 38, capacitor electrodes 152 and 154 which are unitary with or welded to extensions 132 and 134, reference capacitor 42, and capacitance sensor 40 are placed in a fixture that may become part of the mold and are electrically connected together by such as ultrasonic wire bonding. A small amount of potting material is placed over the areas of wire bonds to protect the capacitance sensor and bonded wires. The assembly of the mold is completed and thermoplastic polymer is injection molded around the aforementioned components to form the completed assembly of electrical connector 20, capacitance sensor assembly 130 and capacitor electrode assembly 150.

The materials and methods referred to hereinabove are only suggestions and others may be substituted by those skilled in the relevant arts.

The operation of the angular position sensing system 110 of the invention will now be described with reference to FIGS. 7 through 12. In operation of the system, the capacitance between capacitor electrodes 152 and 154 is small when electric current conductors 164 of armature 160 are outside of the gap between capacitor electrodes 152 and 154. When electric current conductors 164 move into the gap between capacitor electrodes 152 and 154, the gap between the capacitor electrodes is effectively reduced where the electric current conductors 164 are in the gap between capacitor electrodes 152 and 154. For example, the gap between capacitor electrodes 152 and 154 may be one or two millimeters which might result in a capacitance of approximately one picofarad between the two electrodes in the absence of conductors 164 of armature 160. The gap between electric current conductors 164 and capacitor electrodes 152 and 154 may be a approximately 0.05 millimeters to 0.1 millimeters so that the capacitance contributed by the areas of capacitor electrodes 152 and 154 that are in close proximity to electric current conductors 164 are increased by a factor of five to twenty (in the case of this example) relative to the capacitance between the same areas of capacitor electrodes 152 and 154 without the electric current conductors 164.

The capacitance varies linearly with the angle of rotation of armature 160 and is sensed by capacitance sensor 40, which provides a signal that indicates the angular position of armature 160 relative to the capacitor electrodes.

Armature 160 may also move in directions perpendicular to the surfaces of capacitor electrodes 152 and 154 and in other ways that are not pure rotation about the axis of armature 160. This movement will happen because the bearing surfaces 166 are not perfectly smooth and for other reasons. The perpendicular movement will cause each of the electric current conductors 164 to move within the gap between capacitor electrodes 152 and 154 in directions perpendicular to capacitor electrodes 152 and 154. To the extent that the fringing field at the periphery of the electric current conductors 164 can be neglected, the capacitance will not be affected by the movement of electric current conductors 164 within the gap. The ratio of the area covered by the fringing field relative to the area opposed by conductors 164 is reduced if either: 1) the gap is made smaller, or 2) the area of electric current conductors 164 facing capacitor electrodes 152 and 154 is made larger. By making the area where the fringing field enters the capacitor electrodes small relative to the surface areas where electric current conductors 164 oppose the capacitor electrodes, the effects of cross-axis movement are made small. Therefore, the multiplicity of metallic electric current conductors of armature 160 cause the capacitance between capacitor electrodes 152 and 154 to be highly independent of the movements of armature 160 that are not pure rotation while being linearly dependent on the rotational position of armature 160. Accordingly, the invention meets the unmet need for a capacitance based angular position sensor that is insensitive to movements that are distinct from pure rotation.

Proceeding now to describe the third embodiment of the position sensor of the invention with reference to FIGS. 13 through 17: Linear position sensor 210 comprise electrical connector 20, capacitance sensor assembly 230, capacitor electrode assembly 250, and an armature 260 that is axially movable relative to capacitor electrode assembly 250. Alternately, armature 360 (illustrated in FIG. 17) may be substituted for armature 260.

Electrical connector 20 comprises connector pins 26 and 28 in a molded plastic shroud 24. Capacitance sensor assembly 230 is unitary with electrical connector 20 and capacitor electrode assembly 250. Capacitance sensor assembly 230 includes extensions 36 and 38 of connector pins 26 and 28 respectively, reference capacitor 42, extensions 232 and 234 of capacitor electrodes 252 and 254 respectively, and capacitance sensor 40. Capacitor electrode assembly 250 comprises capacitor electrodes 252 and 254 insert molded into the unitary assembly comprising capacitance sensor assembly 230, electrical connector 20, and capacitor electrode assembly 250. Armature 260 comprises a paddle like end 262 having electric current conductors 264 Armature 260 also comprises extension 266 having an opening 268 for connecting to an element that is to have its position sensed by linear position sensor 210. Elements illustrated by dashed or hidden lines are hidden from the viewer by the plastic molding.

Shroud 24, connector pins 26 and 28, capacitance sensor 40, and reference capacitor 42, may be the same as described hereinabove with reference to connector 20 and capacitance assembly 30.

Capacitor electrodes 252 and 254 comprise flat plates made of a metal such as copper or aluminum or other metal selected by those skilled in the relevant arts. If aluminum is selected, it is preferably anodized to minimize friction and galling. Capacitor electrodes 252 and 254 are located parallel to each other defining a gap in which armature 260 moves. Capacitor electrodes 252 and 254 may have bevels at edges 256 and 258 which make the response more linear by smoothing the variations from linearity which may be caused by the granularity of the conductivity of armature 260. Making the axial length of the bevel at edges 256 and 258 extend approximately half of the axial dimensions of one of the electric current conductors 264 provides a smooth response. Capacitor electrodes 252 and 254 have extensions 232 and 234 respectively extending to the vicinity of capacitance sensor 40 to which they are connected. Extensions 232 and 234 may be unitary with capacitor electrodes 252 and 254 or they may be extensions welded to the capacitor electrodes. If extensions 232 and 234 are welded to the capacitor electrodes they may made of be any material known by those skilled in the arts to be suitable for wire bonding to capacitance sensor 40 and welding to the material selected for capacitor electrodes 252 and 254.

In a first preferred design armature 260 is formed of double sided printed circuit board material comprising paddle like end 262, an extension 266, and opening 268 in extension 266. A matrix of pads 264 is formed on paddle like end 262 by the processes used to make pads on printed circuit boards.

One method for forming pads 264 is by applying a photoresist on double sided printed circuit material. The photoresist is removed over the areas between pads 264. The pads are then formed by etching away the copper plate where the photoresist is absent while the pads are protected by photoresist. The pads are sized and located to obtain approximately equal increments of area between the capacitor plates for equal armature movements. The pads 264 may have shapes other than the round shapes illustrated. Diamond shaped pads placed very close to each other provide proportional increments of area when the armature moves and make maximum use of the areas of the capacitor electrodes. However, in a linear position sensor made with round pads as illustrated in FIG. 13 the granularity was not observable. Holes are drilled through each pair of pads and the holes are plated to make electrical connections between the pads. The material of which armature 260 is made preferably has the same thermal expansion coefficient as the material of which capacitor electrode assembly 250 is molded to minimize the effect of temperature on the output signal from linear position sensor 210. The plastic used for armature 260 may be any printed circuit board material having a suitable thermal expansion coefficient and meeting other requirements for the application such as strength and consistent performance over the required range of operating temperatures. Glass filled epoxy or polyphenylene sulfide with about 30% to 40% glass filler are believed to be suitable.

A second method for manufacturing armature 260 is by injection molding a suitable polymer into the form of armature 260 with the holes between the pads formed in the molding process. An adhesion inhibitor is applied to the molding over areas where metallization is not desired, and pads 264 are formed and the holes are plated by plasma spraying as described by Turek et al. in U.S. Pat. No. 5,891,521.

Electrical connector 20, capacitance sensor assembly 230, and capacitor electrode assembly 250 are preferably made by the following insert molding process: Connector pins 26 and 28 which are unitary with extensions 36 and 38, capacitor electrode extensions 232 and 234, reference capacitance 42, and capacitance sensor 40 are placed in a fixture that may become part of the mold and are electrically connected together by such as ultrasonic wire bonding. A small amount of uncured potting material is applied over the wire bonds to protect them. Additional potting material is applied in the vicinity of capacitance sensor 40 to protect and prevent relative movement between the assembled electrical and electronic components. The mold is completed and plastic is injection molded around the aforementioned components to form the unitary assembly comprising electrical connector 20, capacitance sensor assembly 230, and capacitor electrode assembly 250.

Proceeding now with reference to FIG. 17, armature 360 is an alternate to armature 260. Armature 360 is molded of thermoplastic polymer in the form of a paddle like end 362 and an extension 366 having opening 368. Where each electric current conductor 364 will be a pair of slight depressions are molded with a hole connecting the centers of the depressions. The electric current conductors 364 are made by plating the depressions and the holes with a conducting metal. The electric current conductor 364 are sized and located to obtain approximately equal increments of area of electric current conductors 364 between the capacitor plates for equal armature movements. The electric current conductors 364 may have shapes other than round. Diamond shaped conductors 364 placed very close to each other provide proportional capacitance increments when the armature moves and make maximum use of the areas of the capacitor electrodes. The plastic material of which armature 360 is made preferably has the same thermal expansion coefficient as the material of which capacitor electrode assembly 250 is molded to minimize the effect of temperature on the output signal from linear position sensor 210. The material used for armature 360 may be any moldable material on which conductors 364 can be plated, has a suitable thermal expansion coefficient, and meets other requirements of the application for such as strength and consistent performance over the required range of operating temperatures. Glass filled polyester with about 30% to 40% glass filler is believed to be suitable for many applications.

A preferred process for making electric current conductors 364 is to apply vaporized aluminum heated by a tungsten coil in a high vacuum onto the surfaces of the slight depressions and the holes formed when paddle like end 362 is molded. This process is preferably done in a conventional flash vaporizing machine. Aluminum deposited on the lands between the electric current conductors 364 is removed by lapping or any other known process for removing the aluminum not deposited in the depressions and the holes. Alternately, the aluminum may be applied by chemical vapor deposition or by plasma spraying. Alternately to removing unwanted aluminum from the lands, an adhesion inhibitor may be applied to the lands before the vaporized metal is applied. Other known methods for applying electrically conducting material to form electric current conductors 364 on armature 360 may be substituted by those skilled in the relevant arts.

The materials and methods referred to hereinabove are only suggestions and other materials and methods may be substituted by those skilled in the relevant arts.

The operation of the linear position sensing system 210 of the invention will now be described with reference to FIGS. 13 through 17. In operation of the system, the capacitance between capacitor electrodes 252 and 254 is small when the electric current conductors 264 or 364 of armature 260 or 360 respectively are not between capacitor electrodes 252 and 254. When electric current conductors 264 or 364 move into the gap between capacitor electrodes 252 and 254, the gap between the capacitor electrodes 252 and 254 is effectively reduced at the locations of the electric current conductors 264 or 364 between the capacitor electrodes. For example, the gap between capacitor electrodes 252 and 254 may be one or two millimeters which might result in a capacitance of approximately one picofarad between the two electrodes in the absence of armature 260 or 360. The gap between electric current conductors 264 or 364 and capacitor electrodes 252 and 254 may be approximately 0.05 millimeters to 0.1 millimeters so that the capacitance may be increased by a factor of five to twenty (in the example) when the electric current conductors 264 or 364 of armatures 260 or 360 respectively are moved into in the gap between the capacitor electrodes 252 and 254.

The capacitance varies linearly with the position of armature 260 or 360 and is sensed by capacitance sensor 40, which provides a signal that indicates the axial position of armature 260 or 360 relative to the capacitor electrodes. Capacitance sensor 40, as do all capacitance sensors, operates by applying an electric signal across capacitor electrodes 252 and 254 and then sensing the resulting electric current. When an electrical signal is applied between capacitor electrodes 252 and 254 electric charges move from one of the pads of an electric current conductor 264 or 364 that is located in the gap between capacitor electrodes 252 and 254; through the plating on the hole between the pads of the electric current conductor 264 or 364 that is located in the gap; and to the other pad of the electric current conductor 264 or 364.

Particular electric charges may move in directions that are not perpendicular to the surfaces of capacitor electrodes 252 and 254, particularly as they move in an electric current conductor 264 or 364 between the outer periphery of a pad and the center of a pad in their passage to and from the plating on the holes between the pads. However, the movements in an electric current conductor 264 or 364 of charges parallel to the surfaces of capacitor electrodes 252 and 254 cancel as electric charges from opposite diameters of a pad simultaneously move between the outer diameters of the pads and the plating on the holes at the center of the pad. Accordingly, in the aggregate, the movement of the electric charges in an electric current conductor 264 or 364 is along a path collinear with the perpendicular to capacitor electrodes 252 and 254 that passes through the center of the hole between the pads of the electric current conductor 264 or 364.

The armature 260 or 360 may also move in directions and ways that are not aligned with the direction of center line CL indicated in FIG. 13. These movements may include movement perpendicular to center line CL and may include rotation. Movements in directions or ways other than in the direction of the axis CL along which the position of armature 260 or 360 is to be measured are called "cross-axis movements". Cross-axis movement is limited by capacitor electrodes 252 and 254 and by the molded plastic at the sides the gap in which armature 260 or 360 moves. Cross-axis movement causes each of the electric current conductors 264 or 364 to move within the gap between capacitor electrodes 252 and 254 but not into or out of the gap. To the extent that the fringing field at the periphery of the electric current conductors 264 or 364 can be neglected, the capacitance will not be affected by the movement of electric current conductors 264 or 364 within the gap. Therefore, the areas of the fringing field are made small relative to the surface areas where electric current conductors 264 or 364 oppose the capacitor electrodes. The area of the fringing fields is made small by making the gap between conductors 264 or 364 and capacitor electrodes 252 and 254 small and by minimizing the space between electric current conductors 264 or 364. Therefore, the multiplicity of metallic electric current conductors 264 or 364 of armature 260 or 360 respectively cause the capacitance between capacitor electrodes 252 and 254 to be highly independent of the cross-axis position of armature 260 or 360 while being linearly dependent on the axial position of armature 260 or 360. Accordingly, the invention meets the unmet need for an inexpensive capacitance based position sensor that is insensitive to movement not in the axial direction in which position measurement is desired.

Although the description of this invention has been given with reference to particular embodiments, it is not to be construed in a limiting sense. Many variations and modifications will now occur to those skilled in the art. For a definition of the invention reference is made to the appended claims.

What is claimed is:

1. A position sensor comprising:
two capacitor electrodes separated by a gap,
an armature comprising a multiplicity of electric current conductors movable into and out of said gap, and
means responsive to capacitance between said capacitor electrodes by indicating the position of said armature, and wherein
each said electric current conductor is electrically insulated from every other said electric current conductor.

2. The invention as defined by claim 1 wherein:
a said electric current conductor extends from proximity to one of said capacitor electrodes to proximity to the other of said capacitor electrodes when said electric current conductor is located in said gap.

3. The invention as defined by claim 1 wherein:
said capacitor electrodes comprise tubes coaxial about an axis.

4. The invention as defined by claim 3 wherein:
said means responsive to capacitance causes electric current to flow in a said electric current conductor when said electric current conductor is located in said gap, and
said armature is adapted to cause said electric current in said electric current conductor to flow in the aggregate substantially along a path collinear with a perpendicular from said electric current conductor to said axis.

5. The invention as defined by claim 3 wherein:
said capacitance has a variation from linearity with armature position, and
a said tube has an edge shaped to reduce said variation.

6. The invention as defined by claim 1 wherein:
a said electric current conductor comprises metal extending from proximity to one of said capacitor electrodes to proximity to the other of said capacitor electrodes when said electric current conductor is located in said gap.

7. The invention as defined by claim 1 wherein:
said electrodes comprise flat plates,
said electric current conductors are movable with said armature in rotation about an axis for said moving said electric current conductors into and out of said gap.

8. The invention as defined by claim 7 wherein:
said capacitance has a variation from linearity with armature angle, and
a said electrode comprises an edge shaped to reduce said variation from linearity upon said rotation of said armature.

9. The invention as defined by claim 8 wherein:
said edge comprises a multiplicity of sawtooth shaped elements adapted to reduce said variation from linearity upon said rotation of said armature.

10. The invention as defined by claim 7 wherein:
a said electric current conductor comprises material adapted for conducting electric displacement current.

11. A position sensor comprising:
two capacitor electrodes separated by a gap,
an armature comprising electric current conductor movable into and out said gap, and
a capacitance sensor responsive to capacitance between said capacitor electrodes by indicating the position of said armature, and wherein
said capacitance sensor causes electric current to flow in said electric current conductor when said electric current conductor is in said gap, and said armature is adapted to cause said electric current to said flow from proximity to one of said capacitor electrodes to proximity to the other of said capacitor electrodes along substantially the shortest paths between said capacitor electrodes.

12. The invention as defined by claim 11 wherein:

said electric current conductor comprises metal extending from proximity to one of said capacitor electrodes to proximity to the other of said capacitor electrodes when said electric current conductor is located in said gap.

13. The invention as defined by claim 11 wherein:

said electric current conductor comprises material adapted for conducting electric displacement current.

14. The invention as defined by claim 13 wherein:

said electric current conductor comprises electrically conductive polymer.

15. A position sensor comprising:

two capacitor electrodes separated by a gap, an armature comprising electric current conductor movable into and out of said gap, and means responsive to capacitance between said capacitor electrodes by indicating the position of said armature, and wherein said electric current conductor is insulated from electrical contact with all other electrical conductors except said capacitor electrodes.

16. The invention as defined by claim 15 wherein:

said electric current conductor comprises a first surface that is in proximity to one of said capacitor electrodes and a second surface that is in proximity to the other of said capacitor electrodes when said electric current conductor is located between said capacitor electrodes.

17. The invention as defined by claim 16 wherein:

said means responsive to capacitance causes electric current to flow in said electric current conductor, and said armature is adapted to cause said electric current to take substantially the shortest routes from proximity to one of said capacitor electrodes to proximity to the other of said capacitor electrodes.

18. The invention as defined by claim 15 wherein:

said means responsive to capacitance causes electric current to flow in said electric current conductor, and said electric current conductor is adapted to cause said electric current to flow substantially along the shortest path between said capacitor electrodes where said flow is occurring when said electric current conductor is located in said gap.

19. The invention as defined by claim 15 wherein:

said electric current conductor comprises a multiplicity of metallic electric current conductors supported by a matrix that insulates each said metallic electric current conductor from every other said metallic electric current conductor.

20. The invention as defined by claim 15 wherein:

said electric current conductor comprises material adapted for conducting electric displacement current.

21. The invention as defined by claim 15 wherein:

said electric current conductor comprises electrically conductive polymer.

* * * * *